United States Patent [19]

Kitakami et al.

[11] 4,372,613

[45] Feb. 8, 1983

[54] CASING FOR SEAT-BELT RETRACTOR

[75] Inventors: Toshiyuki Kitakami; Yoshinori Akiyama, both of Yokohama, Japan

[73] Assignee: Nissan Motor Co., Ltd., Yokohama, Japan

[21] Appl. No.: 209,175

[22] Filed: Nov. 21, 1980

[30] Foreign Application Priority Data

Nov. 28, 1979 [JP] Japan ............................ 54-165415[U]

[51] Int. Cl.³ ...................... A47C 31/00; A62B 35/00
[52] U.S. Cl. .................................. 297/481; 242/107;
280/807; 297/468; 297/474
[58] Field of Search ............... 297/468, 474, 475, 476,
297/477, 478, 483, 481; 280/807; 248/156;
242/107; 254/403, 411, 413, 414, 415

[56] References Cited

U.S. PATENT DOCUMENTS

| 1,016,965 | 2/1912 | Shea | 254/415 |
|---|---|---|---|
| 1,440,889 | 1/1923 | Parr | 254/414 |
| 3,048,368 | 8/1962 | Hanson | 254/415 |
| 3,125,374 | 3/1964 | Bissell | 297/468 |
| 3,279,851 | 10/1966 | Hinchcliff | 297/481 X |
| 3,287,061 | 11/1966 | Nicholas | 297/481 |
| 3,295,862 | 1/1967 | Ebert | 297/481 X |
| 3,401,980 | 9/1968 | Nicholas | 297/481 |
| 3,785,701 | 1/1974 | Gilmore | 297/481 |
| 3,811,703 | 5/1974 | Turkovich | 297/474 |
| 4,119,344 | 10/1978 | Kondo | 297/468 |
| 4,312,521 | 1/1982 | Thomas et al. | 280/807 |
| 4,318,521 | 3/1982 | Martin et al. | 248/156 X |

FOREIGN PATENT DOCUMENTS

| 2395761 | 1/1979 | France . | |
|---|---|---|---|
| 187173 | 6/1959 | Sweden | 297/475 |
| 896515 | 5/1962 | United Kingdom . | |
| 1118398 | 7/1968 | United Kingdom . | |
| 1238958 | 7/1971 | United Kingdom | 297/475 |

Primary Examiner—James T. McCall
Attorney, Agent, or Firm—Thompson, Birch, Gauthier & Samuels

[57] ABSTRACT

A casing for a seat-belt retractor comprises an additional flexible webbing guide sleeve through which the seat belt is pulled out. The sleeve is telescopically extendable and adjustably pivotable and bendable when the seat belt is pulled out. Therefore, the seat-belt retractor thus improved is usable with various models of cars, even if the direction in which the seat belt is pulled out changes. Since the housing and the sleeve are both made of a flexible plastic material, it is very easy to assemble these parts together by deforming appropriate portions thereof.

4 Claims, 5 Drawing Figures

CASING FOR SEAT-BELT RETRACTOR

BACKGROUND OF THE INVENTION

1. Field of the Invention

The present invention relates generally to a casing used for a seat-belt retractor for an automotive vehicle into which the seat belt is automatically wound by the action of a winding spring when the tension of the seat belt is released, and more particularly to a casing for a seat-belt retractor such that its webbing guide sleeve is telescopically extendable and adjustably pivotable and bendable when the seat belt is pulled out therethrough.

2. Description of the Prior Art

As is well-known, there have been various safety seat-belt retractors used for automotive vehicle safety belts to protect a driver or passengers seated within the passenger compartment from injury when the vehicle is suddenly decelerated in such an emergency case as collision. Usually, the seat-belt retractor is arranged in position somewhere behind the driver or passenger and the seat belt can be pulled out easily therefrom when the driver wants to put on it for safety.

In the past, however, it has been necessary to select a seat-belt retractor having a suitable webbing guide angle from among various types of retractors. This is because the shape and size and position and angle of the seat differs according to the model of car.

SUMMARY OF THE INVENTION

With these problems in mind therefore, it is the primary object of the present invention to provide a seat-belt retractor which can be used for various kinds of cars.

To achieve the above-mentioned object, the seat-belt retractor of the present invention comprises a flexible rectangular webbing guide sleeve which is both telescopically extendable and adjustably pivotable and bendable when the seat belt is pulled out therethrough. The guide sleeve is made of a flexible material such as plastic and has a pair of short pins implanted on each of two opposite sides of the sleeve for pivoting the sleeve thereabout.

BRIEF DESCRIPTION OF THE DRAWINGS

The features and advantages of a casing for a seat-belt retractor according to the present invention will be more clearly appreciated from the following description taken in conjunction with the accompanying drawings in which like reference numerals designate corresponding elements and in which.

DETAILED DESCRIPTION OF THE PREFERRED EMBODIMENT

Figure 1A:
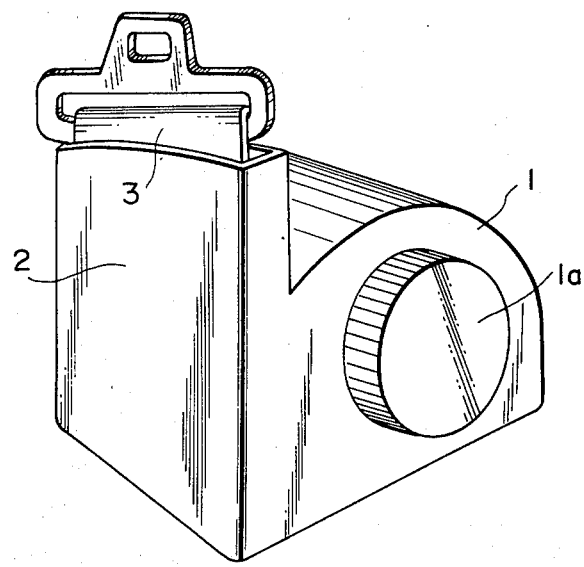
FIG. 1(a) is a perspective view showing a casing of a prior art seat-belt retractor.
Figure 1B:
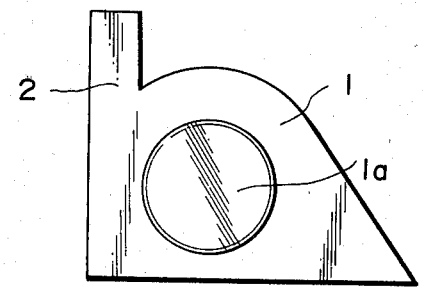
FIG. 1(b) is a side view thereof.

To facilitate complete understanding of the present invention, a brief reference will be made to a prior-art casing for a seat-belt retractor. Referring to FIGS. 1(a) and (b), housing 1 of a seat-belt retractor supports a winding device mechanism 1a and has a webbing guide portion 2 integrally formed with the housing 1, through which a seat belt 3 is pulled out or wound up.

In this prior-art retractor, if the shape and size of the seat vary according to the model of car, it has been necessary to select, among many, a suitable casing having a webbing guide sleeve having an appropriate angle and length. This has required that many different models of seat-belt retractors having different webbing guide sleeve angles be available.

Figure 2:
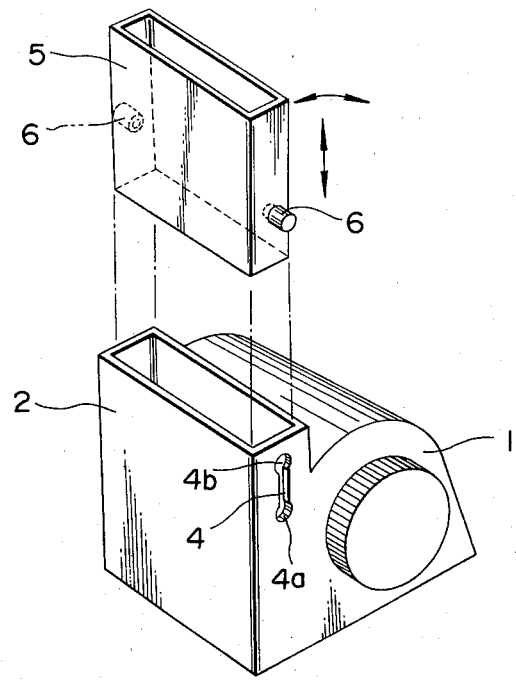
FIG. 2 is an exploded perspective view of the preferred embodiment of the present invention.
Figure 3:
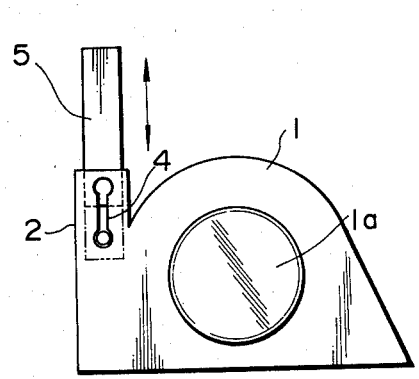
FIG. 3 is a side view of the embodiment of FIG. 2 showing that the webbing guide sleeve is telescopically extendable from the housing.
Figure 4:
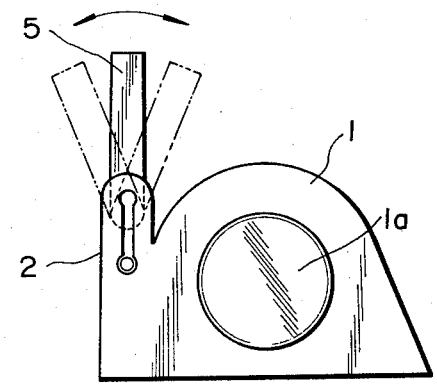
FIG. 4 is another side view of the embodiment of FIG. 2, showing that webbing guide sleeve is adjustably pivotable and bendable with respect to the housing.

In view of the above description, reference is now made to FIGS. 2 to 4, and more specifically to FIG. 2, wherein the preferred embodiment of the seat-belt retractor of the present invention is illustrated.

In FIG. 2, a housing 1 has a webbing guide portion 2, and a slot 4 is provided on each of two opposite sides of the housing 1. In addition to this housing 1, a flexible rectangular webbing guide sleeve 5 having a pair of metal pins 6 on each side is fitted within the opening of the housing 1. The metal pins 6 are implanted together into the sleeve 5 in a one-step plastic molding process. Being made of a flexible plastic material, the sleeve 5 is easily fitted into the opening of the housing 1 by pushing towards each other the two opposite sides of the sleeve 5 in which the pair of metal pins 6 are implanted.

The diameter of the pins 6 is designed to be a little larger than the width of the slots 4 for a tight fit, and the seat belt rather completely fills the sleeve 5; therefore, when the seat belt is pulled out, the seat belt pulls the sleeve 5 therewith and, thereby, the sleeve 5 is slidably moved from a first click position 4a (lower side in FIG. 2) to a second click position 4b (upper side), as shown in FIG. 3. As shown in the drawings, since the slot is formed in dumbbell shape having a wider portion at each end, the sleeve is clicked and retained therein when moved to the ends.

In the housing thus described, in the case of a model of car where a seat having a relatively short seat cushion is provided and therefore the driver sits back in the seat and upright with respect to the cushion, the housing is used, for example, with the sleeve 5 at the first click position (lower side in FIG. 3) by pushing the sleeve 5 down by hand. On the other hand, in the case where a seat having a relatively long seat cushion is provided and therefore the driver sits forward in the seat and leans backwards against the seat back, the housing is used with the sleeve 5 at the second click position (upper side) where the sleeve 5 is pulled outwardly together with the belt.

In this embodiment, although the sleeve 5 is moved automatically from the first click position to the second click position when the seat belt tightly passing therethrough is pulled out and the sleeve can be moved back from the second position to the first position by hand, it is also possible to lock the sleeve 5 in position by appropriate screws.

Moreover, in this embodiment, when used at the second click position, the sleeve 5 can pivot and bend right and left with the pins 6 as its pivot point, since the width of the sleeve is smaller than that of the opening of the housing and the sleeve is made of a relatively soft plastic material, as depicted in FIG. 4. Therefore, the seat belt 3 is smoothly pulled in and out through the guide sleeve even if the direction in which the belt is pulled changes according the seats.

As described hereinabove, according to the present invention, since the sleeve is telescopically extendable along the slot and adjustably pivotable and bendable about the pins, the casing is usable for various models of cars, and is practical for permitting the direction of seat belt movement to vary from the line of movement of the pins within the slots to enable the seat belt to be easily withdrawn and retracted when the user's seat is in any of its adjustable positions.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A casing for a seat-belt retractor comprising:
(a) a housing for retracting a seat belt therein when the tension of the seat belt is released, said housing having an opening for passing the seat belt therethrough and a dumbbell shaped slot provided on each of two opposite side thereof;
(b) a flexible rectangular webbing guide sleeve through which the seat belt is passed, said sleeve being fitted within the opening of said housing; and
(c) a pair of pins implanted in said sleeve for connecting said sleeve to said housing, said pins extending through the slots in a manner to permit said sleeve to telescopically extend from a first position essentially within said housing to a second position extending therefrom, said pins being snap-fitted to the wider end portions of respective slots for selectively retaining said sleeve in either of its two positions, whereby when said sleeve is in its second position, said sleeve is permitted to bend from the axis of movement within said housing.

2. A casing for a seat-belt retractor as set forth in claim 1, wherein said housing is made of a flexible material.

3. A casing for a seat-belt retractor as set forth in claim 1 or 2, wherein said sleeve is made of a flexible material.

4. A casing for a seat-belt retractor as set forth in claim 1, 2 or 3, wherein said pins are made of metal and are implanted into said sleeve together in a one-step plastic molding process.

* * * * *